(12) United States Patent
Ishikawa et al.

(10) Patent No.: US 11,117,194 B2
(45) Date of Patent: Sep. 14, 2021

(54) ADDITIVE MANUFACTURING HAVING ENERGY BEAM AND LAMP ARRAY

(71) Applicant: Applied Materials, Inc., Santa Clara, CA (US)

(72) Inventors: David Masayuki Ishikawa, Mountain View, CA (US); Paul J. Steffas, Santa Clara, CA (US); Brian Hayes Burrows, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 569 days.

(21) Appl. No.: 15/904,161

(22) Filed: Feb. 23, 2018

(65) Prior Publication Data

US 2018/0264551 A1    Sep. 20, 2018

Related U.S. Application Data

(60) Provisional application No. 62/471,848, filed on Mar. 15, 2017.

(51) Int. Cl.
*B22F 10/20* (2021.01)
*B33Y 30/00* (2015.01)
(Continued)

(52) U.S. Cl.
CPC ............ *B22F 10/20* (2021.01); *B22F 3/24* (2013.01); *B28B 1/001* (2013.01); *B28B 17/0081* (2013.01); *B33Y 10/00* (2014.12); *B33Y 30/00* (2014.12); *B22F 3/1017* (2013.01); *B22F 10/30* (2021.01); *B22F 2003/248* (2013.01);
(Continued)

(58) Field of Classification Search
CPC ............ B22F 3/1055; B22F 3/1017; B22F 2003/248; B33Y 50/02; B28B 1/001
See application file for complete search history.

(56) References Cited

U.S. PATENT DOCUMENTS 5,017,753 A    5/1991  Deckard
6,376,148 B1   4/2002  Liu et al.
(Continued)

FOREIGN PATENT DOCUMENTS

JP    H03-89451    4/1991
JP    H06-246839   9/1994
(Continued)

OTHER PUBLICATIONS

International Search Report and Written Opinion in International Application No. PCT/US2018/022417, dated Jul. 24, 2018, 11 pages.

*Primary Examiner* — Jacob T Minskey
*Assistant Examiner* — Adrien J Bernard
(74) *Attorney, Agent, or Firm* — Fish & Richardson P.C.

(57) ABSTRACT

An additive manufacturing system includes a platform to support an object to be fabricated, a dispenser to deliver a plurality of layers of a feed material over the platform, a controller configured to store digital data representing a pre-defined pattern, a laser configured to generate a laser beam to impinge an outermost layer of the feed material and coupled to the controller to fuse the feed material in the pre-defined pattern, and a plurality of independently controllable infrared lamps, each infrared lamp directed to a different section of an outermost layer of the feed material.

13 Claims, 7 Drawing Sheets

(51) Int. Cl.
  *B28B 1/00* (2006.01)
  *B28B 17/00* (2006.01)
  *B33Y 10/00* (2015.01)
  *B22F 3/24* (2006.01)
  *B33Y 50/02* (2015.01)
  *B22F 10/30* (2021.01)
  *B22F 3/10* (2006.01)

(52) U.S. Cl.
  CPC ........... *B22F 2999/00* (2013.01); *B33Y 50/02* (2014.12); *Y02P 10/25* (2015.11)

(56) References Cited

U.S. PATENT DOCUMENTS

| | | | |
|---|---|---|---|
| 6,376,804 B1 | 4/2002 | Ranish et al. |
| 6,780,368 B2 | 8/2004 | Liu et al. |
| 6,811,744 B2 | 11/2004 | Keicher et al. |
| 6,815,636 B2 | 11/2004 | Chung et al. |
| 7,261,542 B2 | 8/2007 | Hickerson et al. |
| 7,419,632 B2 | 9/2008 | Keller |
| 7,521,652 B2 | 4/2009 | Chung et al. |
| 7,569,174 B2 | 8/2009 | Ruatta et al. |
| 7,718,933 B2 | 5/2010 | Huskamp |
| 7,790,096 B2 | 9/2010 | Merot et al. |
| 7,850,885 B2 | 12/2010 | Philippi et al. |
| 8,137,739 B2 | 3/2012 | Philippi et al. |
| 9,556,525 B2 | 1/2017 | Dierkes et al. |
| 9,919,476 B2 | 3/2018 | Paternoster et al. |
| 2002/0090313 A1 | 7/2002 | Wang et al. |
| 2004/0104499 A1 | 6/2004 | Keller |
| 2004/0175451 A1* | 9/2004 | Maekawa ............... B29C 41/36 425/144 |
| 2009/0206522 A1 | 8/2009 | Hein et al. |
| 2011/0165340 A1 | 7/2011 | Baumann |
| 2014/0170012 A1 | 6/2014 | Delisle et al. |
| 2015/0021815 A1 | 1/2015 | Albrecht et al. |
| 2015/0064047 A1 | 3/2015 | Hyde et al. |
| 2015/0165524 A1 | 6/2015 | Ljungblad et al. |
| 2016/0221262 A1* | 8/2016 | Das ..................... B29C 35/0805 |
| 2016/0288266 A1 | 10/2016 | Rockstroh et al. |
| 2016/0379851 A1* | 12/2016 | Swaminathan ........ C23C 16/505 438/715 |
| 2017/0021418 A1 | 1/2017 | Ng et al. |
| 2017/0021419 A1 | 1/2017 | Ng et al. |
| 2017/0036404 A1 | 2/2017 | Rengers et al. |
| 2017/0072644 A1* | 3/2017 | Ng ....................... B29C 64/393 |

FOREIGN PATENT DOCUMENTS

| | | |
|---|---|---|
| JP | H07-021998 | 1/1995 |
| JP | 04-856979 | 1/2012 |
| JP | 04-857103 | 1/2012 |
| JP | 04-917381 | 4/2012 |
| JP | 06-067852 | 1/2017 |
| WO | WO 2015/094719 | 6/2015 |
| WO | WO 2016/122647 | 8/2016 |

\* cited by examiner

ADDITIVE MANUFACTURING HAVING ENERGY BEAM AND LAMP ARRAY

CROSS-REFERENCE TO RELATED APPLICATIONS

This application claims priority to U.S. Application Ser. No. 62/471,848, filed on Mar. 15, 2017, the disclosure of which is incorporated by reference.

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

This specification describes technologies relating to additive manufacturing.

In one aspect, an additive manufacturing system includes a platform to support an object to be fabricated, a dispenser to deliver a plurality of layers of a feed material over the platform, a controller configured to store digital data representing a pre-defined pattern, a laser configured to generate a laser beam to impinge an outermost layer of the feed material and coupled to the controller to fuse the feed material in the pre-defined pattern, and a plurality of independently controllable infrared lamps, each infrared lamp directed to a different section of an outermost layer of the feed material.

In another aspect, an additive manufacturing system includes a platform to support an object to be fabricated, a dispenser to deliver a plurality of layers of a feed material over the platform, an energy source configured to generate an energy beam to impinge an outermost layer of the feed material, a plurality of independently controllable lamps positioned over the platform, and a controller. Each lamp is configured to heat a different zone of an outermost layer of the feed material. The controller is configured to store digital data representing a pre-defined pattern, is coupled to the energy source to cause the energy beam to fuse a portion of the feed material in the pre-defined pattern, and is coupled to the plurality of independently controllable lamps to cause the lamps to preferentially heat a zone corresponding to a first region of the outermost layer that include the pattern compared to a zone corresponding to a second region that is outside the pattern.

In another aspect, an additive manufacturing system includes a platform to support an object to be fabricated, a dispenser to deliver a plurality of layers of a feed material over the platform, an energy source configured to generate an energy beam to impinge an outermost layer of the feed material, a plurality of independently controllable lamps positioned over the platform to heat a plurality of zones of the outermost layer of the feed material, a motor, and a controller configured to store digital data representing a pre-defined pattern and coupled to the energy source to cause the energy beam to fuse a portion of the feed material in the pre-defined pattern. The energy source is configured to scan the energy beam along a first axis. Each lamp is configured to heat a different zone, and the zones are arranged in at least one linear array along the first axis. The motor is configured to generate relative motion between the plurality of independently controllable lamps and the platform along a second axis perpendicular to the first axis.

Implementations of the above aspects may include one or more of the following features.

The plurality of independently controllable lamps may be positioned and configured to heat the first region of the outermost layer of the feed material before the energy beam fuses the portion of the feed material. The controller may be configured to cause the plurality of independently controllable lamps to heat the first region to a first temperature that is below a second temperature at which the feed material fuses. The first temperature may be above a third temperature at which the feed material undergoes necking. The first temperature may be above a third temperature at which the feed material undergoes caking. The controller may be configured to control the plurality of independently controllable lamps such that the second region remains below the third temperature.

The plurality of independently controllable lamps may be positioned and configured to heat the first region of the outermost layer of the feed material after the energy beam fuses the portion of the feed material. The controller may be configured to cause the plurality of independently controllable lamps to deliver heat to the first region such that the first region undergoes a cool-down along a predetermined temperature curve.

The energy source may include a laser, the energy beam may be a laser beam and the plurality of independently controllable lamps may be infrared lamps. The energy source and the plurality of independently controllable lamps may be secured to a support, and a motor may create relative motion between the platform and the support. The controller may be is configured to cause the energy source to scan the energy beam along a first axis. The motor may be configured to generate the relative motion along a second axis perpendicular to the first axis. A mirror may be configured to direct the laser beam from the laser along the first axis.

A support may holds the energy source and the plurality of independently controllable lamps, and the motor may be configured to create relative motion between the platform and the support. The energy source may include a laser to generate a laser beam and a mirror configured to direct the laser beam from the laser along the first axis. The laser and the mirror may be supported by the support.

The controller may be configured to cause the plurality of independently controllable lamps to selectively heat a portion of the outermost layer that includes the pre-defined pattern, the portion being less than an entire outermost layer of feed material. The controller may be configured such that sections that do not include voxels of the pre-defined patterned are not heated by the plurality of independently controllable lamps or are heated to a lower temperature than sections that include the pre-defined pattern.

The plurality of independently controllable lamps may be positioned and configured to heat a zone on the outermost layer of the feed material positioned before the laser beam along a direction of motion of the plurality of independently controllable lamps relative to the platform. The plurality of plurality of independently controllable lamps may be positioned and configured to heat a zone on the outermost layer of the feed material positioned after the laser beam along the direction of motion of the plurality of independently controllable lamps relative to the platform.

A first lamp of the plurality of independently controllable lamps may be directed towards a first zone, and a second lamp of the plurality of independently controllable lamps may be directed towards a second zone, and the first zone and the second zone may partially overlap. The plurality of independently controllable lamps may be arranged in a linear array. Each zone of the plurality of zones may be ten to fifty times larger than a spot size of the energy beam on the outermost layer of feed material. Each zone may be about 1 cm across. The plurality of independently controllable lamps comprise infrared lamps.

In another aspect, an additive manufacturing system includes a platform to support an object to be fabricated, a dispenser to deliver a plurality of layers of a feed material over the platform, and a plurality of independently controllable infrared lamps. Each infrared lamp is directed to a different zone on an outermost layer of the feed material. One or more of the lamps includes a cylindrical bulb, a filament within the cylindrical bulb with a central axis of the filament being substantially parallel to the platform; and a lens positioned parallel to the cylindrical bulb and the central axis of the filament, the lens configured to direct light from the filament to the zone.

In another aspect, an additive manufacturing system includes a platform to support an object to be fabricated, a dispenser to deliver a plurality of layers of a feed material over the platform, and a plurality of independently controllable infrared lamps, each infrared lamp directed to a different zone on an outermost layer of the feed material. One or more of the lamps may be provided by a substrate with a surface facing a section of the platform; and a filament printed on the substrate, the filament configured to emit infrared radiation towards the section of the platform.

Implementations of the above aspects may include one or more of the following features.

A housing may surround the cylindrical bulb. The housing may have a flow channel configured to cool the cylindrical bulb. The lens may be a plano-concave lens, a double-concave lens, a plano-convex lens or a biconvex lens. The lens may be fused silica. The cylindrical bulb may be positioned within a housing, the lens providing one side of the housing. An inner surface of the housing may have a dark coating to absorb heat from the bulb. An inner surface of the housing may have a mirrored finish to reflect infrared light through the lens.

An energy source may be configured to generate an energy beam to impinge an outermost layer of the feed material, and a controller may be configured to store digital data representing a pre-defined pattern, and may be coupled to the energy source to cause the energy beam to fuse a portion of the feed material in the pre-defined pattern. A support may hold the energy source and the plurality of independently controllable lamps, and a motor may be configured to create relative motion between the platform and the support.

In another aspect, a method of fusing during additive manufacturing includes fusing a portion of a region of a first layer of powdered feed material using a laser beam, and at least one of i) prior to fusing the portion, pre-heating by a lamp the region of the first layer, or ii) after fusing the portion, heat-treating by an infrared lamp the region that includes the fused portion.

Implementations of the above aspect may include one or more of the following features.

Pre-heating by the infrared lamp may include activating the infrared lamp to heat the region of the bed of powdered feed material prior to the laser beam fusing the portion, and causing relative motion between the layer of powdered material and the infrared lamp until the region lies below a laser scanning area of the laser beam. Heat-treating by the infrared lamp may include causing relative motion between the layer of powdered material and the infrared lamp until the region including the fused portion lies below the infrared lamp, and causing the infrared lamp to apply heat the region to produce a heat treatment temperature profile in the region after the laser beam has fused the portion. A second layer of feed material may be added over the first layer, a second region in the second layer of powdered feed material may be pre-heated by the infrared lamp, a second portion in the pre-heated second region may be fused by the laser, and the fused second portion may be heat-treated by an infrared lamp.

The bed of powdered feed material may include a metal powder. A portion of the layer of feed material to be fused by the laser beam may be determined by a controller.

Advantages of the foregoing may include, but are not limited to, the following. By pre-heating the powder, power required for a laser to fuse the powder can be reduced without reducing the size of the melt pool. Thermal excursions can be reduced, which can improve quality of the part. By heat-treating the fused powder, the temperature of the fused material during cool down can be controlled, which can reduce thermal stress and improve quality of the fused powder. Caking of powder in areas that are not being fused can be reduced, thus increasing the amount of powder that can be recycled. The lamp can provide power at high efficiency.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For additive manufacturing processes that involve fusing two-dimensional layers of powder, uneven thermal gradients (either spatial or temporal) within the build volume can cause parts to warp and crack during the manufacturing process. Pre-heating a platform that supports the part and powder can mitigate the thermal gradient issues for short parts, but fails to alleviate cracking and deformation for tall parts that have many more layers. For tall parts, the distance from the outermost layer to the pre-heated platform can be too distant to control thermal gradients. Furthermore, tall parts require more time to build, which can result in larger thermal gradients. Increasing the platform pre-heating temperature or using other pre-heating methods to minimize thermal gradients in tall parts can result in "caking" of the majority of the powder on the platform and renders the powder unsuitable for reuse.

However, a feed powder can be pre-heated by applying radiative energy to the outermost layer prior to fusing in order to control thermal gradients in both the horizontal and vertical directions during the manufacturing process, which can improve sintering quality and throughput. Heat can also be applied to the fused sections of the part after fusing (also referred to as "heat-treating") and before the next layer of powder is dispensed in order to control the rate of cool-down and thereby minimize residual stresses and further improve sintering quality, e.g., by reducing the likelihood of warping and cracking of the part. The heat can also be used to compensate for thermal non-uniformity due to radiative, convective, and conductive losses within the build volume.

The powder is pre-heated and/or heat-treated with an array of lamps, e.g., infrared lamps, that can selectively pre-heat and/or heat-treat the powder in regions that will be and/or that become fused by a laser beam. The selective pre-heating enables only a portion of the powder to cake and can significantly reduce wasted powder.

Figure 1:
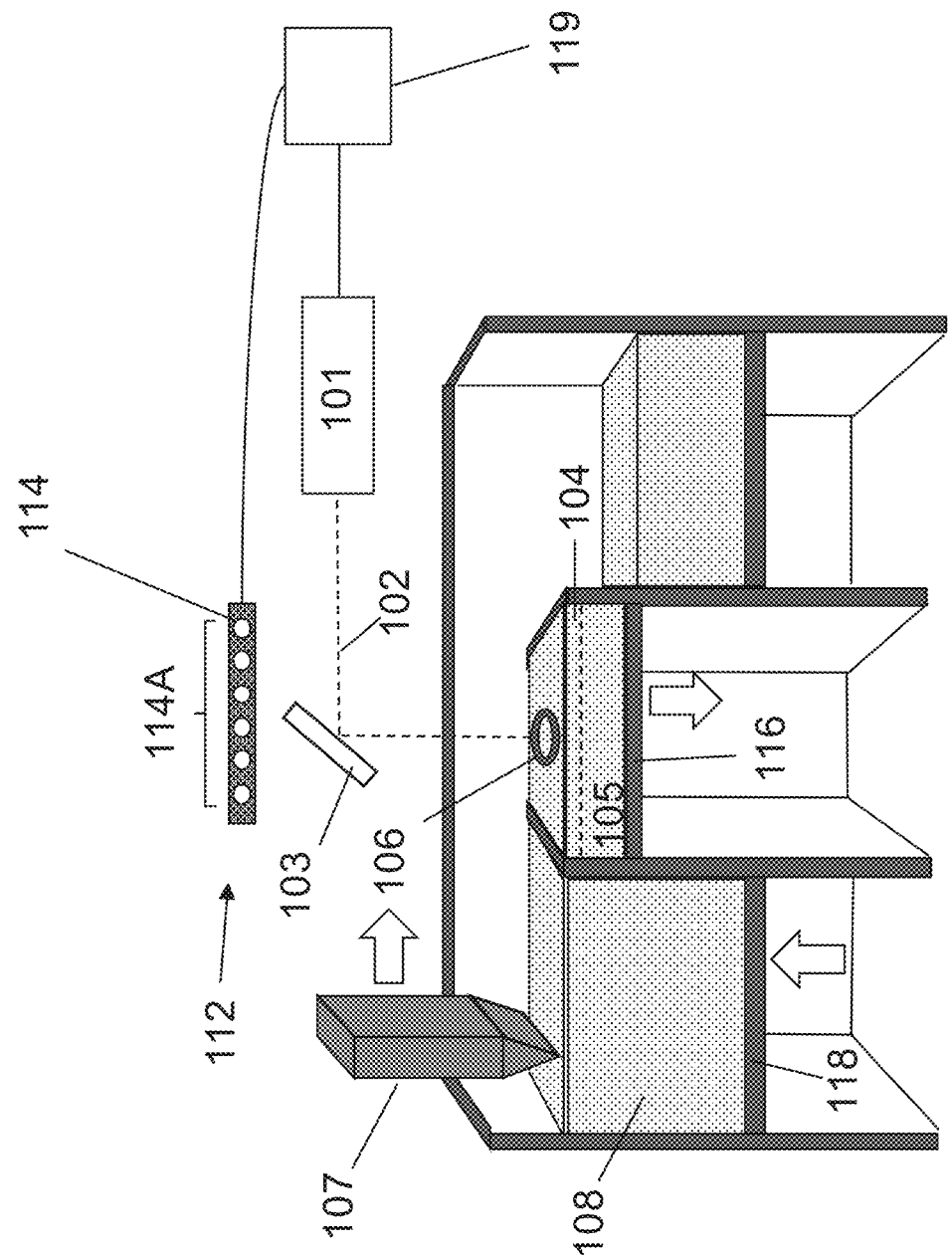
FIG. 1 is a schematic diagram showing a side view through a cross-section of an example additive manufacturing system.

An example additive manufacturing system 100 is shown in FIG. 1. The additive manufacturing system 100 includes a platform 116 to support an object 106 to be fabricated. The additive manufacturing system also includes a dispenser 107 to deliver a top layer 104 of a feed material 105 over the platform, and an energy source 101 to create an energy beam 102 that can scan across a top layer 104 of the feed material 105 to fuse the feed material 105.

The additive manufacturing system 100 includes a controller 119 that can store digital data representing a pre-defined pattern that can form an object 106. The controller is coupled to and controls other components, such the energy source 101 and dispenser 107, to cause the system 100 to fuse the layer in accordance with the pre-defined pattern so as to form the object 106.

Figure 2A:
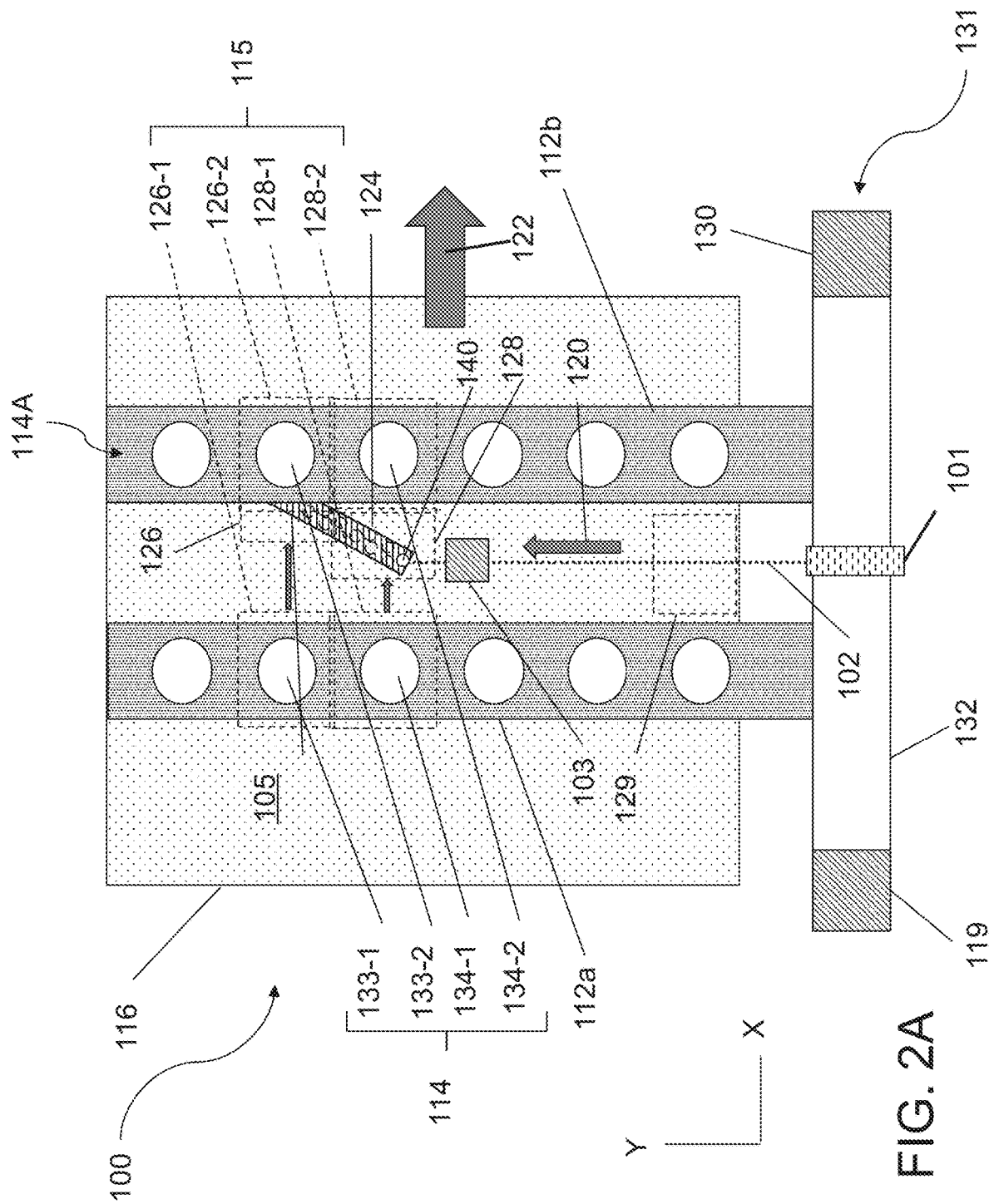
FIG. 2A is a schematic diagram showing top-down view of an example additive manufacturing system.

In some implementations, such as the implementation illustrated in FIGS. 1 and 2A, the dispenser 107 can include a flat blade or paddle to push the feed material from a feed material reservoir 108 across the platform 116. In such an implementation, the feed material reservoir 108 can also include a feed platform 118 positioned adjacent the build platform 116. By elevating the feed platform 118, the volume of the reservoir 108 can be reduced and the feed material raised above the level of feed material and/or part on the platform 116; the blade can push the feed material 104 from the feed platform 118 to the build platform 116.

Alternatively or in addition, the dispenser 107 can include a plurality of nozzles suspended above the platform 106 through which the powder flows. For example, the powder could flow under gravity, or be ejected, e.g., by piezoelectric actuator. Control of dispensing of individual nozzles could be provided by pneumatic valves, microelectromechanical systems (MEMS) valves, solenoid valves, and/or magnetic valves. Other systems that can be used to dispense powder include a roller having apertures, an augur inside a tube having apertures, or a hopper having apertures. The dispenser 107 can be moved by a drive system, e.g., a linear actuator, to scan across the platform 116, thus delivering the top layer 104 of powder 105.

Optionally, the system 100 can include a compaction and/or levelling mechanism to compact and/or smooth the layer of feed materials deposited over the platform 106. For example, the system can include a roller or blade that is movable parallel to the platen surface by a drive system, e.g., a linear actuator.

The feed material 105 can include metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

The feed material 105 can include ceramic particles. Examples of ceramic materials include metal oxide, such as ceria, alumina, silica, aluminum nitride, silicon nitride, silicon carbide, or a combination of these materials, such as an aluminum alloy powder.

The feed material can be dry powders or powders in liquid suspension, or a slurry suspension of a material. For example, for a dispenser that uses a piezoelectric printhead, the feed material would typically be particles in a liquid suspension. For example, a dispenser could deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

A laser 101 generates a laser beam 102 to impinge the top layer 104 of the feed material 105. The laser beam 102 selectively delivers sufficient heat to fuse the feed material 105 in the pre-defined pattern stored in the controller 119. Fusing in the context of this specification can include melting and solidification, or sintering while still in solid form, or other processes of fusing a powder.

The laser beam 102 can be caused to scan along a first axis (also referred to as a Y-axis) one or more actuators. For example, the laser beam 102 can directed by a movable mirror 103, e.g., a galvo mirror system. The controller 119 controls the angle of the mirror 103. Power to the laser 101 can be controlled as the laser beam 102 scans across the layer 104 of feed material 105 to selectively fuse voxels according to the pre-defined pattern.

The Y-axis can be parallel to the direction of motion of the dispenser 107 (e.g., from left to right in FIG. 1), e.g., the blade or nozzles, across the platform. Alternatively, the Y-axis can be perpendicular to the direction of motion of the dispenser 107.

The additive manufacturing system 100 also includes multiple independently controllable lamps 114 in a lamp array 114A. At any particular time, each lamp 114 in the lamp array 114A illuminates a different zone on the top layer 104 of the feed material 105. Power to each lamp 114 in the lamp array 114A can be independently modulated, e.g., by adjustment of power to a filament, to adjust the radiant flux emitted to the feed material 105. Modulation of the power can range from zero to one hundred percent.

In some implementations, the lamps 114 can be arranged in a linear array 112. The linear array 112 extends along the same axis, e.g., the Y-axis, as the scanning direction of the laser beam 102. The infrared lamps 114 can be positioned to be outside (i.e., not block) the path of the laser beam 102. In some implementations, the infrared lamps 114 can be less than twenty-five millimeters above the bed of feed material 105 in order to maximize heating efficiency. In some implementations, the infrared lamps 114 can be positioned more than twenty-five millimeters above the bed of feed material 105.

Figure 2B:
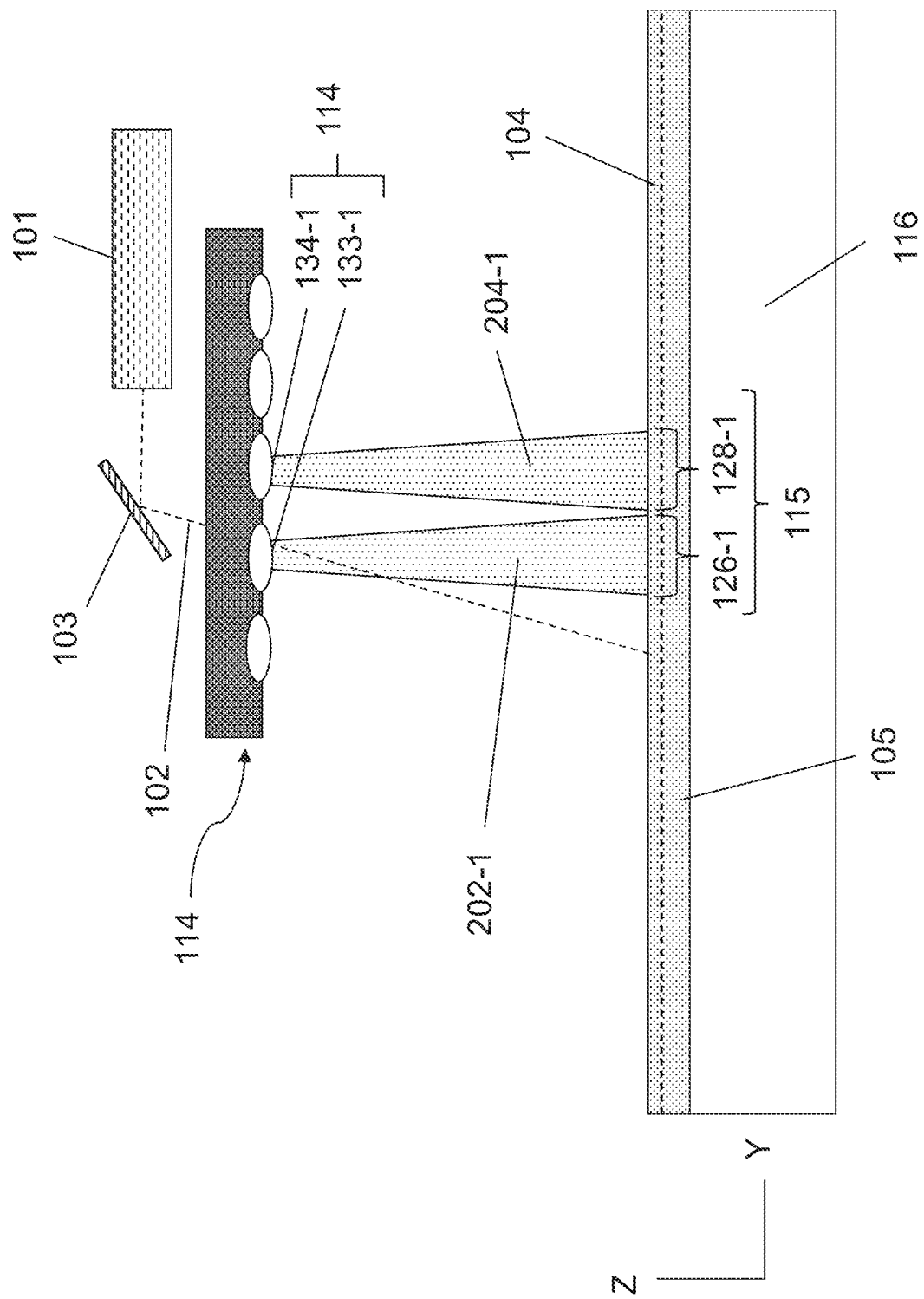
FIGS. 2B-2C are schematic diagrams showing side views of the example additive manufacturing system.
Figure 2C:
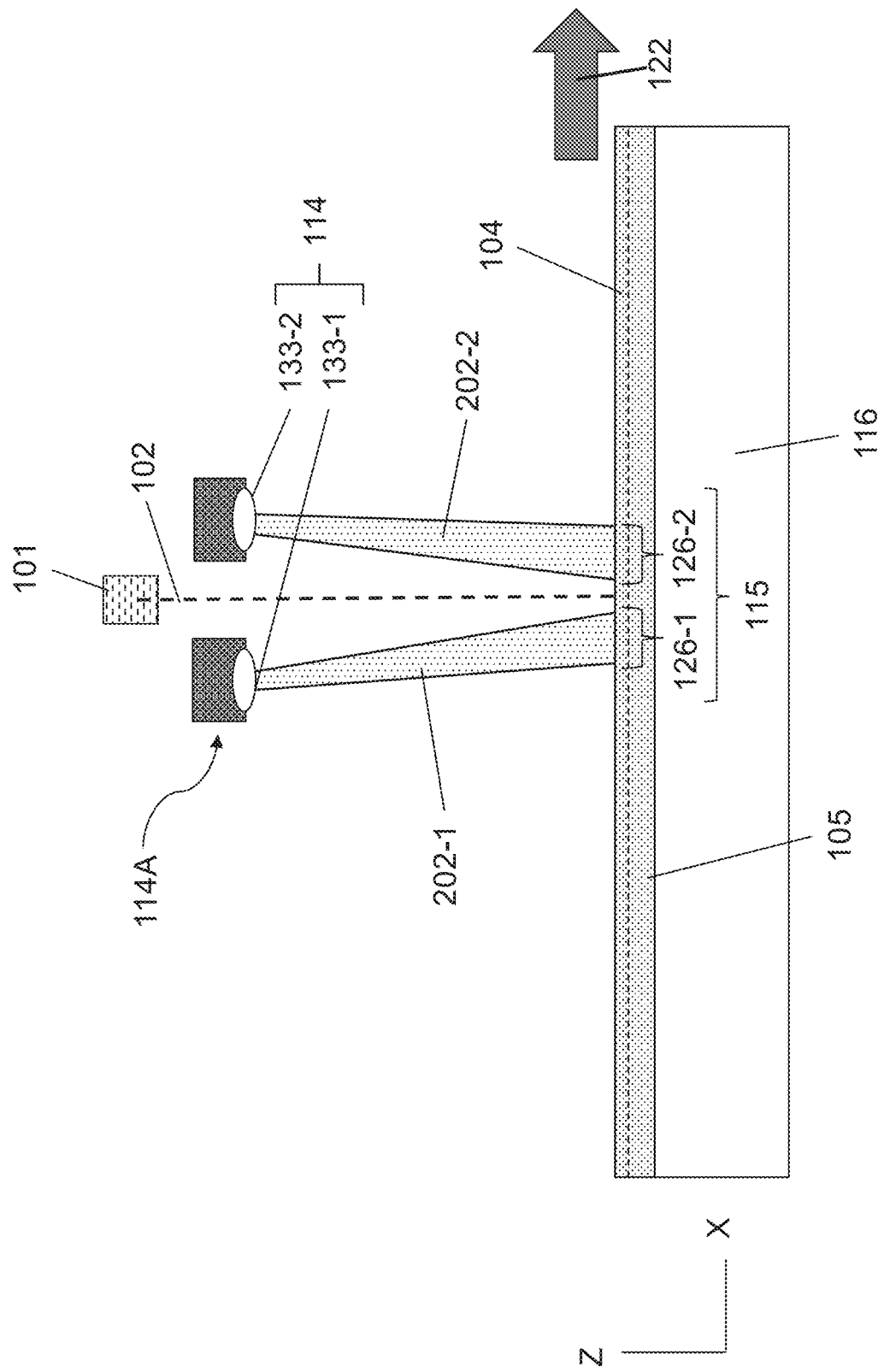

FIG. 2A illustrates a top-down view of the system 100 with the platform 116 covered with a bed of feed material 105. FIG. 2B shows a side view of the system 100 across the Y-axis during manufacturing operations. FIG. 2C shows a front view of the system 100 across the X-axis during manufacturing operations.

The adjustable mirror 103 directs the laser beam 102 from the laser 101 in a scan direction along the first axis 120 (e.g., the Y-axis).

The infrared lamps 114 are positioned above the platform 116, and thus above the bed of feed material 105. In some implementations, the lamps 114 can be in a single linear array, e.g., array 112a or array 112b, that extends along the first axis. In some implementations, the lamps 114 can be arranged in two linear arrays 112a, 112b. In particular, the lamps 114 can be arranged in two spaced apart parallel linear arrays 112a, 112b that each extend along the first axis 120 (e.g., the Y-axis).

The lamps 114 in the first array 112a can include lamps 133-1, 134-1, etc., whereas the lamps 114 in the second array 112b can include lamps 133-2, 134-2, etc. As noted above, at any particular time, each lamp 114 in the lamp array 114A illuminates a different zone 115 of the top layer 104 of the feed material 105. For example, lamps 133-1, 133-2, 134-1, 134-2 can illuminate zones 126-1, 126-2, 128-1, 128-2 of the feed material, respectively. Assuming the lamps 114 are not movable relative to each other, then the zones 115, e.g. zones 126-1, 126-2, 128-1, 128-2, can also remain immobile relative to each other.

The zones 115 can also be arranged in one or more linear arrays that generally mimic the arrangement of the lamps 114. For example, the zones 115 can be in a single linear array, e.g., an array that includes zones 126-1, 128-1, etc., or in an array that includes zones 126-2, 128-2, etc. In some implementations, the zones 115 can be arranged in two linear arrays, and in particular in two spaced apart parallel linear arrays (one with zones 126-1, 128-1, etc., and another linear array with zones 126-2, 128-2, etc.) that each extend along the first axis 120 (e.g., the Y-axis).

The arrays 112a, 112b of lamps 114 can be spaced apart to provide room for the laser 102 and other components, e.g., the mirror 113. However, in some implementations (e.g., as shown in FIG. 2C) the lamps 114 are oriented to direct light at a non-normal angle to the layer 114. This can permit the spacing between the zones 115 and the spot 104 of the laser beam 102 to be reduced.

The laser 101 and the lamps 114 are secured to a support 131. For example, the support 131 can include a gantry 132 that supports the laser 101, the adjustable mirror 103, and the lamps 114 above the platform 116. A motor 130 can create relative motion between the platform 116 and the support 131. In particular, the motor 130 can move the support 131, and thus the laser 101 and lamps 114, along a second axis 122 that is orthogonal to the first axis 120 and substantially parallel to platform. Alternatively, the platform 116 could be moved by an actuator while the support 131 remains stationary.

Because the laser 101 and lamps 114 are both secured to the support 131, they remain in a fixed position (along the X-axis) relative to each other. Similarly, although the spot 140 impinged by the laser beam 102 can move along the Y-axis, the spot 140 will remain in a fixed position (along the X-axis) relative to the zones 115, e.g., zones 126-1, 126-2, 128-1, 128-2, that can be heated by the lamps 114.

In operation, the motor 130 can create relative motion between the platform 116 and the support 131 along the X-axis, while the laser beam 102 is scanned, e.g., by the mirror 103, along the Y-axis. Alternatively, the motor 130 could create relative motion between the platform 116 and the support 131 along the X-axis between scans by the laser beam 102 along the Y-axis. In either case, this effectively provides a raster scan of the laser beam 102 across the outermost layer of feed material. The controller 119 can cause the laser 101 to modulate the laser beam 102 during this scan such that the feed material 104 is fused according to the pattern stored in the controller 119.

The controller 119 can cause the additive manufacturing system 100 to generate relative motion in a first direction of motion 120 with the adjustable mirror 103 while the laser beam fuses the feed material, and in a second direction of motion 122 with the gantry 132 and the motor 130 either during or between scans by the laser beam along the first direction of motion 120. In particular, arrow 122 illustrates the direction of motion of the layer 104 of feed material 105 relative to the support 131 (this could be provided by motion of the platform 116 from left to right, or by motion of the support 131 from right to left).

As noted above, the controller 119 can modulate the laser beam 101 to selectively fuse voxels of the top layer 104 of the feed material 105 in the pre-defined pattern stored. For example, along each scan along the Y-axis, the laser beam 101 is modulated to fuse only voxels with a corresponding column of the pre-defined pattern. After each step of the support 131 or platform 116 along the X-axis, the laser beam 101 is modulated to fuse only voxels with the next corresponding column of the pre-defined pattern. Assuming that the feed material 105 is moving relative to the support 131 in the direction of arrow 122, the already fused portion 124 of top layer 104 will lie on the side of the spot 140 indicated by the arrow 122 (e.g., to the right in FIG. 2B). As illustrated by the example of FIG. 2A, this can result in fusing of the feed material 105 along a pre-determined path on the top layer 104. Although the region 124 is illustrated as a linear area, it can actually be formed of multiple individual adjacent voxels.

In addition, the controller can cause the controllable infrared lamps 114 to apply heat one or more portions of the feed material 105, such as a first portion 126 and a second portion 128, that include voxels of the region 124 that will be and/or have been fused by the laser beam 102. However, no heat, or less heat, can be applied to portions, e.g., portion 129, that do not include voxels that are fused by the laser beam 102.

If the lamps 114 and the associated zones 115 are positioned before the laser beam 102 along the direction of motion of the spot 140 along the X-axis relative to the feed material 105 (e.g., to the left if the platform 116 is moving to the right while the support 131 is stationary), then the lamps 114 can provide pre-heating of the feed material. For example, when the portion 126 of the feed material 105 is within the zone 126-1 that can be heated by lamp 133-1, the lamp 133-1 can be activated to pre-heat the feed material 105 in that zone 126-1. Due to the relative motion, the pre-heated portion 126 will then be carried to and through the scan line of the laser beam 102 for selective fusing of the region 124 of feed material.

Similarly, if the lamps 114 and the associated zones 115 are positioned after the laser beam 102 along the direction of motion of the spot 140 along the X-axis relative to the feed material 105 (e.g., to the right if the platform 116 is moving to the right while the support 131 is stationary), then the lamps 114 can provide heat treatment of the feed material. In particular, relative motion will carry the portion 126, which can now include fused material of region 124, below the array 112b of lamps 114. For example, when the portion 128 of the feed material 105 is within the zone 128-1 that can be heated by lamp 134-1 the lamp 134-1 can be activated to pre-heat the feed material 105 in that zone 128-1.

In addition, the controller can modulate power to the individual lamps according to a temperature calibration file that relates the power applied to the lamps 114 to the temperature of the feed material 105. The controller can modulate the power to the lamps 114 to bring various portions, e.g., portions 128 versus portion 129, to different temperatures.

Above some temperatures, a powder may become tacky and thus viscous. This can interfere with proper depositing of the layer or subsequent layers. Thus, for some additive manufacturing processes, it is desirable to raise the temperature of the powder, but not above a threshold temperature at which the powder becomes tacky or viscous. In the context of metal powders, "tacky" can indicate a small amount of necking or sintering, e.g., some percentage of particles become sintered at points of contact but without significant morphology change in the particles.

Assuming the infrared lamps 114 are for pre-heating, e.g., the lamps are positioned in the array 112a to heat a region before the spot illuminated by the laser beam, the lamps 114 can heat the portion, e.g., portions 126, 128, that will include fused voxels of the pattern 124 to a first temperature that is below a second temperature at which the feed material fuses. This first temperature can be above a third temperature at which the feed material undergoes necking. The first temperature can be above a fourth temperature at which the feed material undergoes caking. This higher fourth "caking" temperature is above the threshold at which the powder undergoes sintering at points of contact, but still low enough that the resulting material remains substantially porous and does not experience significant densification, e.g., achieves a cake-like consistency. In some implementations, this higher fourth temperature is above the caking temperature but still below a fusing temperature at which feed material fuses, e.g., sinter or melts to form a solid mass with lower porosity or reduced gaps between particles.

A first lamp (133-1 or 133-2) can be directed towards a first zone (126-1 or 126-2) of the platform 116 and a second lamp (134-1 or 134-2) can be directed towards a second zone (128-1 or 128-2) of the platform 116. In some instances, the first zone 126-1 and the second zone 128-2 partially overlap. For example, the first zone 126 and the second zone 128 can overlap by about 5-15% of the width (along the Y direction) of each zone.

Assuming the infrared lamps 114 are for heat-treatment, the controller 119 can control the infrared lamps 114 to cause one or more sections that include fused voxels of the pattern 124 to undergo a cool-down along a predetermined temperature curve. In other words, the controller 119 can cause the infrared lamps 114 to selectively heat a portion of the outermost layer of feed material 104 that includes the pre-defined pattern 124 and thus includes the fused part, the portion being less than an entire outermost layer of feed material 105.

Along the Y-axis, each of the different independently heatable zones, e.g., the zones 126-2 and 128-1, can cover multiple voxels, and consequently the heated portions, e.g., portions 126, 128 can include multiple voxels. For example, the zones can be about ten to fifty times larger than a voxel. The zones can be about ten to fifty times larger than the spot size of the laser beam on the outermost layer of feed material 105. For example, each of the different zones can be approximately 10 mm wide.

Since the heat is being delivered to each zone by a single lamp (excluding areas where zones overlap at the edges, but including at least the center of the zone), the heat delivered to the voxels in the zone is controlled in common. However, as noted above, the infrared lamps 114 can be individually controlled. This permits variation of heat delivered along the Y-axis, at least on a zone by zone basis. On the other hand, since the feed material is moving relative to the zones (as shown by arrow 122), the heat delivered can be varied over time. This permits variation of total heat delivered along the X-axis. This variation can apply for either pre-heating (using zones 126-1 and 128-1), or heat treatment (using zones 128-1 and 128-2), or both.

In some implementations, the additive manufacturing system 100 includes a cooling system to assist in cooling down the layer of feed material after it has been fused, e.g., to assist in causing the feed material to follow the predetermined temperature curve. The cooling system could include coolant channels in the platform 116, a cooling fan positioned to blow a coolant gas across the top surface of the feed material on the platform 116, or an air knife to blow coolant gas onto feed material along a linear stripe, e.g., along the Y-axis.

The controller 119 ensures that sections that do not include voxels of the pre-defined pattern 124 are not heated by the infrared lamps 114 or are heated to a lower temperature than sections that include the pre-defined pattern 124. In some implementations, the sections outside of the defined voxels are heated to a temperature that is below the caking temperature of the feed material 105.

The infrared lamps 114 are positioned to heat regions of the outermost layer of the feed material 105 positioned on the platform 116 before the laser beam 102 passes over the region and/or after laser beam 102 passes over the region.

In the illustrated example of FIGS. 2B and 2C, the fused path 124 extends from the first region 126 to the second region 128. In the illustrated example, the first region 126 is pre-heated by a first infrared beam 202-1 emitted from the first infrared lamp 133-1, and is heat-treated by a second infrared beam 204-1 emitted from the second infrared lamp 134-1 after the laser beam 102 fuses the region 126 within the first portion 126. The second portion 128 that the fusion path extends through is pre-heated by a third infrared beam 202-2 emitted by a third infrared lamp 133-2 prior to the laser beam 102 passing over the fusion path that extends through the second region 128, and is heat-treated by a fourth infrared beam 204-2 emitted from the fourth infrared lamp 134-2 after the laser beam 102 fuses the region 124 within the section portion 128. In some implementation, the first and third infrared beams 202-1 and 202-2 can remain active during the fusion process. In some implementations, the first infrared beam 202-1 and third infrared beam 202-2 heat the feed material 105 in the first portion 126 and the second portion 128 to a first temperature that is below the feed material fusing temperature but above a necking temperature and/or a caking temperature of the feed material 105

Figure 3:
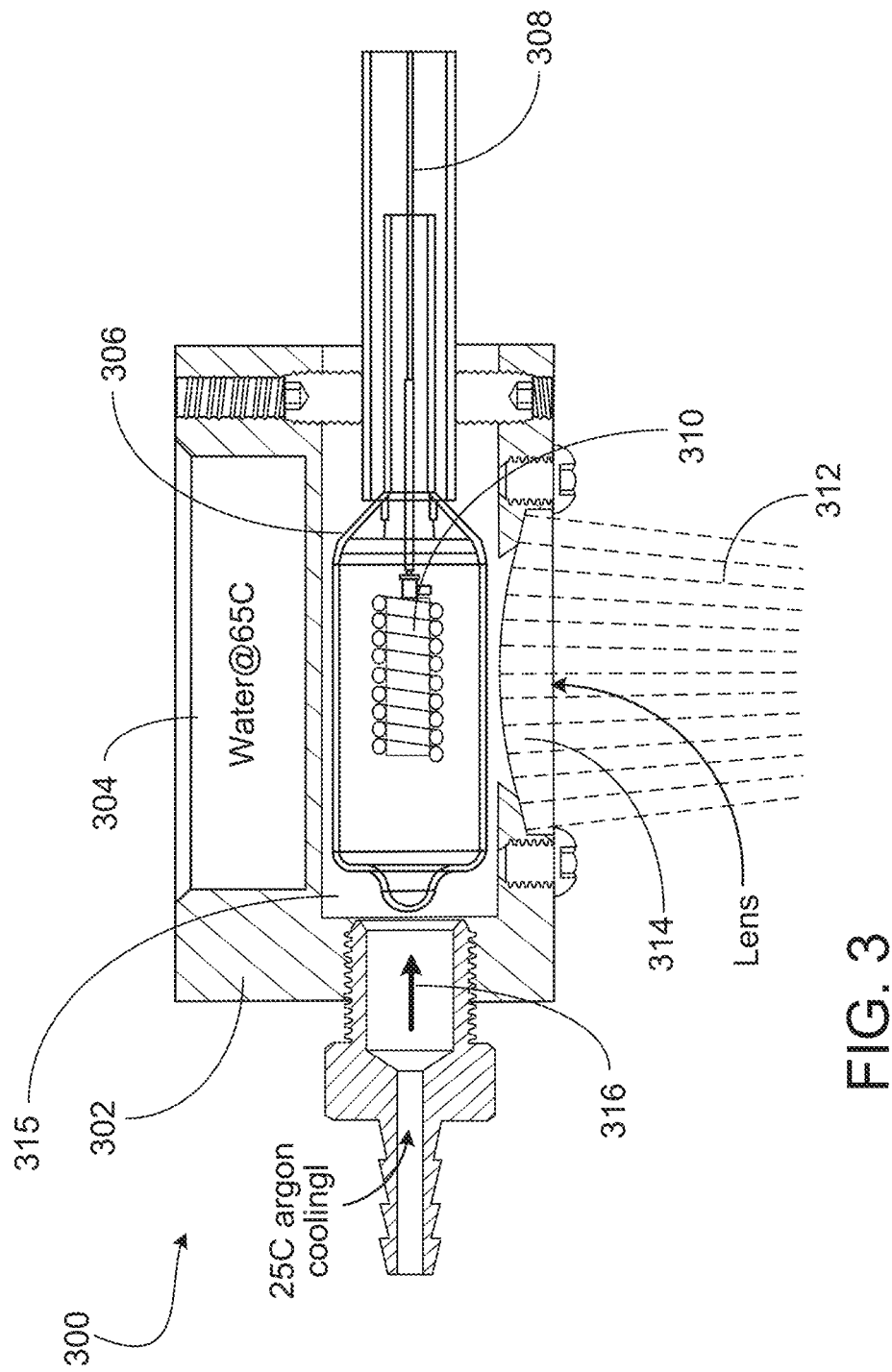
FIG. 3 is a schematic diagram showing a cross-sectional view of an example infrared lamp.

Many different variations of infrared lamps 114 can be used for the manufacturing system 100. One example is shown in FIG. 3. In this example, the infrared lamp 300 includes a cylindrical bulb 306 that houses a filament 310. The bulb 306 has a central axis that can be substantially parallel to the platform; the filament 310 forms coils that wind around an axis that is substantially parallel to the platform.

The bulb is supported within a housing 302. The housing 302 surrounds the cylindrical bulb 306 and includes a flow channel 315 through which a fluid coolant can flow to cool the cylindrical bulb 306. The flow channel 315 includes a cooling gas inlet 316 and a cooling gas exhaust 308 that can be coupled to a thermal exchanger. The cooling gas can include argon, nitrogen, or any other gas that is appropriate for cooling the bulb. The housing also includes a cooling jacket 304 that can include water to cool the housing 302.

A lens 314 is positioned parallel to the cylindrical bulb 306 and the central axis of the filament 310. The lens 314 directs light from the filament 310 to a section of the platform by forming an infrared beam 312. In particular, the lens 314 can help focus the light from the filament 310 onto the respective section of the feed material. The lens 314 can be a plano-convex lens or a biconvex lens, or another lens that can adequately focus the light on the desired area of the platform 116. In some implementations, the lens 314 can include fused silica, silicon, sapphire, or any other transparent and heat resistant material. In some implementations, rather than a lens, a flat window of uniform thickness cam be placed in front of one or more bulbs.

In some implementation, an inner surface of the housing 302 can comprise a dark coating to absorb heat from the bulb 306. This prevents heat from being reflected back onto the bulb 306, and thus can prolong bulb life. In some implementations, the inner surface of the housing 302 can comprise a mirrored finish to reflect extra infrared light through the lens 314.

Figure 4:
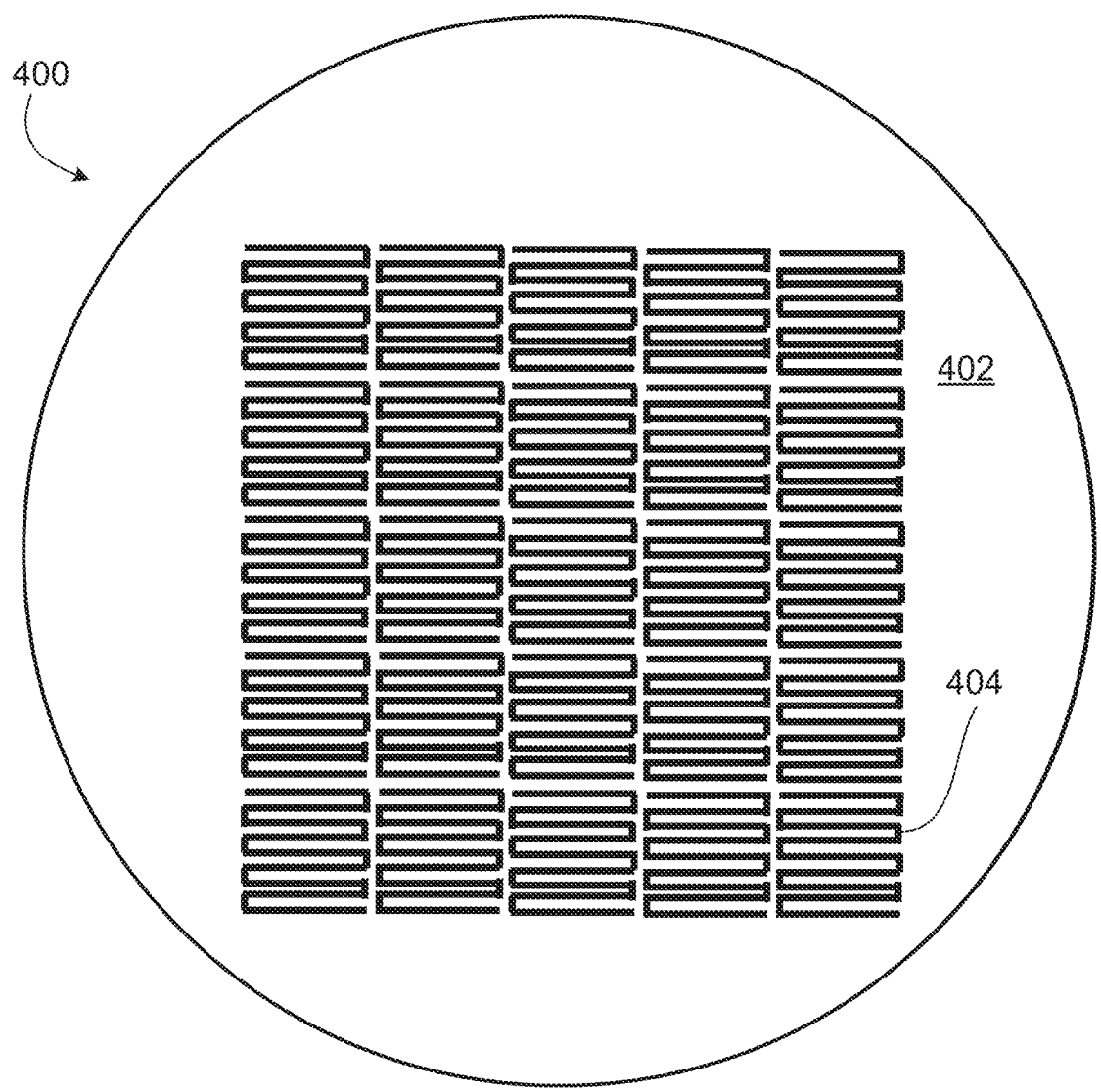
FIG. 4 is a schematic diagram showing an example lamp array.

As previously mentioned, many different variations of infrared lamps 114 can be used for this application. Another example is shown in FIG. 4. In this example, the infrared lamp 400 includes a flat substrate 402 with a surface facing a section of the platform 116 and a filament 404 printed on the substrate. The filament 404 can emit infrared radiation towards a section of the platform 116. In this implementation, each filament 404 can correspond to a different section of the platform 116. While two examples of infrared lamps have been discussed, the examples in this specification should not be construed as limiting.

Figure 5:
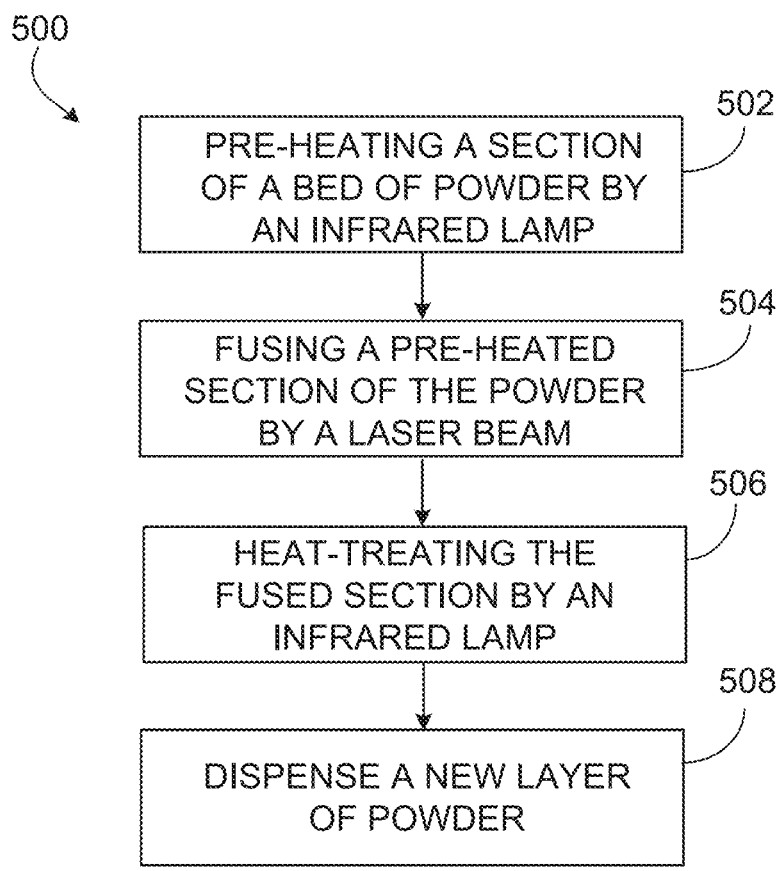
FIG. 5 shows a flowchart of an example method of additive manufacturing.

FIG. 5 is a flowchart of an example method 500 that can be used to manufacture an object through additive manufacturing. First, a region 124 on the layer of feed material that will be fused by the laser beam 102 is determined. This can be specified, for example, by the predetermined pattern stored by the controller. A region of a bed of powdered feed material 105 is pre-heated by an infrared lamp 114 (502).

The feed material 105 can include a metal powder. The infrared lamp 114 that is set to heat the region of the bed of powdered feed material 105 that contains voxels within the portion to be fused is activated prior to the laser beam fusing the voxels within the region.

The portion within pre-heated region is fused by a laser beam (504). This portion can be less than all of the pre-heated region. The region containing the fused voxels is heat-treated by an infrared lamp 114 (506). The infrared lamp 114 that heats the portion of the bed of powdered feed material 105 containing the fused voxels is activated after the laser beam has fused the voxels within the region, and is deactivated after a pre-determined amount of time. The pre-determined time corresponds to a target cooling curve of the fused feed material 105. The pre-heating, the fusing, and the heat-treating are repeated along the fusing path 124 of the laser beam 102.

Once all of the desired portions of the layer of feed material have been fused, e.g., the path 124 has been fused, a new layer of feed material 105 is deposited over the platform (508). The platform can be lowered or the support 131 raised to maintain a constant distance between the lamps 114 and the outermost layer from layer-to-layer. The process can then repeat, with regions of the bed of the subsequent layer of powdered feed material 105 being pre-heated by the infrared lamp 114 and at least part of a pre-heated region fused by a laser beam 102. The region including the fused portion in the subsequent layer is heat-treated by an infrared lamp 114. This process is repeated until the desired object 106 has been manufactured.

The processing conditions for additive manufacturing of metals and ceramics are significantly different than those for plastics. For example, in general, metals and ceramics require significantly higher processing temperatures. For example, metals need to processed at temperature on the order of 400° C. or higher, e.g., 700° C. for aluminum. In addition, processing of metal should occur in vacuum or inert gas environment, e.g., to prevent oxidation. Thus 3D printing techniques for plastic may not be applicable to metal or ceramic processing and equipment may not be equivalent. In addition, the fabrication conditions for large scale-industrial parts can be significantly more stringent. Nonetheless, some techniques described here could be applicable to plastic powders. Examples of plastic powders include nylon, acrylonitrile butadiene styrene (ABS), polyurethane, acrylate, epoxy, polyetherimide, polyetheretherketone (PEEK), polyetherketoneketone (PEKK), polystyrene or polyamides.

The controller 190 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 190, e.g., as controlled by firmware or software, can interpret the data object received from the computer to generate the set of signals necessary to control the components of the apparatus 100 to fuse the specified pattern for each layer.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

A number of implementations have been described. Nevertheless, it will be understood that various modifications may be made. For example, Instead of a laser beam, an electron beam from an electron beam source could be used to fused the feed material. Both the laser and the electron beam source can be considered energy sources to generate energy beams to fuse the feed material.

Instead of a galvo, a rotating polygon can be used to deflect the laser beam.

To provide relative motion along the Y-axis, either the platform 116 or the support holding the lamps and laser, or both, can be moved.

Although the system is illustrated with heat lamps for both pre-heating and one heat-treatment, the system could do only pre-heating or only heat treatment. In this case, rather than two parallel linear arrays of heat lamps, the system could include just one linear array of heat lamps, before or after, respectively the laser beam.

Rather than an infrared lamp, a visible light lamp could be used for heating.

Thus, particular implementations of the subject matter have been described. Other implementations are within the scope of the following claims. In some cases, the actions recited in the claims can be performed in a different order and still achieve desirable results.

What is claimed is:

1. An additive manufacturing system comprising:
   a platform to support an object to be fabricated;
   a dispenser to deliver a plurality of layers of a feed material over the platform;
   an energy source configured to generate an energy beam to impinge an outermost layer of the feed material, the energy source configured to scan the energy beam along a first axis;
   a plurality of independently controllable lamps positioned over the platform to heat a plurality of zones of the outermost layer of the feed material, each lamp configured to heat a different zone, wherein the plurality of independently controllable lamps are arranged in a first linear array and a second linear array such that the zones are arranged in at two parallel linear stripes along the first axis, wherein lamps of the first array are positioned and configured to pre-heat zones in a first stripe of the two parallel stripes that is positioned before the energy beam along a second axis perpendicular to the first axis, and lamps of the second array are positioned and configured to heat-treat zones in a second stripe of the two parallel stripes that is positioned after the energy beam along the second axis;
   a motor configured to generate relative motion between the plurality of independently controllable lamps and the platform along the second axis perpendicular to the first axis; and
   a controller configured to store digital data representing a pre-defined pattern that corresponds to the object to be fabricated, and coupled to the energy source to cause the energy beam to fuse a portion of the feed material in the pre-defined pattern, and wherein the controller is configured to cause the plurality of independently controllable lamps to selectively pre-heat prior to fusing the portion or heat-treat after fusing the portion a region of the outermost layer that includes the pre-defined pattern, the region being greater than the portion of the feed material corresponding to the pre-defined pattern and less than an entire outermost layer of feed material.

2. The system of claim 1, comprising a support that holds the energy source and the plurality of independently controllable lamps, and the motor is configured to create relative motion between the platform and the support.

3. The system of claim 2, wherein the energy source comprises a laser to generate a laser beam and a mirror configured to direct the laser beam from the laser along the first axis, and wherein the laser and the mirror are supported by the support.

4. The system of claim 1, wherein the controller is configured such that zones that do not include voxels of the pre-defined patterned are not heated by the plurality of independently controllable lamps or are heated to a lower temperature than sections that include the pre-defined pattern.

5. The system of claim 1, wherein a first lamp of the plurality of independently controllable lamps is directed towards a first zone, and a second lamp of the plurality of independently controllable lamps is directed towards a second zone, and wherein the first zone and the second zone partially overlap.

6. The system of claim 1, wherein each zone of the plurality of zones is ten to fifty times larger than a spot size of the energy beam on the outermost layer of feed material.

7. The system of claim 1, wherein each zone is about 10 mm across.

8. The system of claim 1, wherein the plurality of independently controllable lamps comprise infrared lamps.

9. The system of claim 1, wherein a first lamp of the first array is directed towards a first zone, and a second lamp of the first array is directed towards a second zone, and wherein the first zone and the second zone partially overlap.

10. The system of claim 1, wherein the controller is configured to cause the plurality of independently controllable lamps to heat one or more zones that include voxels of the pre-defined patterned to a first temperature that is below a second temperature at which the feed material fuses.

11. The system of claim 10, wherein the first temperature is above a temperature at which the feed material undergoes necking.

12. The system of claim 11, wherein the first temperature is above a temperature at which the feed material undergoes caking.

13. The system of claim 12, wherein the controller is configured to cause the plurality of independently controllable lamps to heat one or more zones that do not include voxels of the pre-defined patterned to a third temperature that is below a temperature at which the feed material undergoes caking.

* * * * *

UNITED STATES PATENT AND TRADEMARK OFFICE
CERTIFICATE OF CORRECTION

PATENT NO. : 11,117,194 B2
APPLICATION NO. : 15/904161
DATED : September 14, 2021
INVENTOR(S) : David Masayuki Ishikawa, Paul J. Steffas and Brian Hayes Burrows Page 1 of 1

It is certified that error appears in the above-identified patent and that said Letters Patent is hereby corrected as shown below:

In the Claims

Column 14, Line 7, in Claim 1, after "in" delete "at".

Column 14, Line 44, in Claim 4, delete "patterned" and insert --pattern-- therefor.

Column 15, Line 1, in Claim 10, delete "patterned" and insert --pattern-- therefor.

Column 15, Line 12, in Claim 13, delete "patterned" and insert --pattern-- therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*